United States Patent
Kanayama et al.

(10) Patent No.: US 10,433,357 B2
(45) Date of Patent: Oct. 1, 2019

(54) MARINE TELECOMMUNICATIONS NETWORK BUILDING SYSTEM AND TELECOMMUNICATIONS TERMINAL FOR SMALL BOATS

(71) Applicant: Honda Motor Co., Ltd., Tokyo (JP)

(72) Inventors: Hisanori Kanayama, Wako (JP); Ryuichi Kimata, Tokyo (JP); Takashi Hashizume, Wako (JP); Keiichiro Bungo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/933,286

(22) Filed: Mar. 22, 2018

(65) Prior Publication Data

US 2018/0288821 A1   Oct. 4, 2018

(30) Foreign Application Priority Data

Mar. 29, 2017   (JP) ................. 2017-064061

(51) Int. Cl.
*H04B 7/185*   (2006.01)
*H04W 76/14*   (2018.01)
*G01S 5/10*   (2006.01)
*G01S 5/02*   (2010.01)
*G01S 5/04*   (2006.01)
*G01S 19/46*   (2010.01)
*H04W 88/04*   (2009.01)
*H04W 84/18*   (2009.01)

(52) U.S. Cl.
CPC .......... *H04W 76/14* (2018.02); *G01S 5/0236* (2013.01); *G01S 5/04* (2013.01); *G01S 5/10* (2013.01); *G01S 19/46* (2013.01); *H04W 84/18* (2013.01); *H04W 88/04* (2013.01)

(58) Field of Classification Search
CPC ... H04W 40/22; H04W 84/005; H04W 84/12; H04W 84/18
USPC ........................ 455/11.1, 13.1, 41.2
See application file for complete search history.

(56) References Cited

U.S. PATENT DOCUMENTS

2014/0220923 A1\* 8/2014 Shoshan ................ H04W 4/90
455/404.1
2014/0368601 A1\* 12/2014 deCharms ............. H04W 4/021
348/14.02
2017/0230841 A1\* 8/2017 Rao ...................... H04W 16/26

FOREIGN PATENT DOCUMENTS

JP   3437990 B2   8/2003

\* cited by examiner

*Primary Examiner* — Tu X Nguyen
(74) *Attorney, Agent, or Firm* — Duft & Bornsen, PC

(57) ABSTRACT

There is provided a marine telecommunications network building system to communicate from one of boats navigating on sea to a base station on land with a telecommunications terminal mounted on each of the boats. The telecommunications terminal is configured to build the telecommunication network to establish a communication paths enabling mutual communication between one of the boats exists out of the communication range with the base station and other of the boats that exists within the communication range such that the one of the boats communicates with the base station.

1 Claim, 10 Drawing Sheets

MARINE TELECOMMUNICATIONS NETWORK BUILDING SYSTEM AND TELECOMMUNICATIONS TERMINAL FOR SMALL BOATS

CROSS-REFERENCE TO RELATED APPLICATION

This application is based upon and claims the benefit of priority from Japanese Patent Application No. 2017-064061 filed on Mar. 29, 2017, the contents of which are incorporated herein by reference.

BACKGROUND OF THE INVENTION

Field of the Invention

This invention relates to a marine telecommunications network building system and a telecommunications terminal for small boats.

Description of Related Art

When a boat, particularly a small boat like a motorboat, is navigating at sea, it preferably accesses a cloud or other server to transmit (upload) the boat's own navigating condition data, to acquire (download) data necessary for navigation, and/or to engage in other such communication activities. In such a case, a wireless LAN or other wireless data telecommunications terminal mounted on the boat accesses the server via a land base station (access point).

However, when the base station is on land, as is usual owing to the difficulty of building one in the sea, boats navigating at sea are unfortunately often beyond communication range. Ways to cope with this include using a high-power wireless terminal or accessing the server after approaching land to within communication range with the base station, but these expedients are disadvantageous because the former is costly and the latter lacks data real-time capability. Large ships usually use satellite telephones, but this is even more costly and not a viable option for small boats.

In this connection, a telecommunications method for performing group communications among multiple telecommunications terminals is taught by Japanese Patent No. 3437990. In this technology, communication paths are sequentially formed among those of many freely moving telecommunications terminals that are adjacent within a radio wave reachable range, and a network is built that enables individual telecommunications terminals to communicate with arbitrary other telecommunications terminals in the group using adjacent telecommunications terminals as relay points.

A configuration according to the aforesaid technology set out in the reference makes it possible within the group for any telecommunications terminal to perform on-demand communication with any other telecommunications terminal, without using a base station. However, this is a method for sending/receiving data among telecommunications terminals temporarily gathered in a town or other land location and cannot be applied to communication between multiple boats navigating at sea and a cloud or other server through a base station on land.

SUMMARY OF THE INVENTION

An object of this invention is therefore to overcome the aforesaid problem by providing a system of building a marine telecommunications network for, in a group of small boats comprising multiple boats navigating at sea, enabling even boats beyond communication range with a land base station to communicate with the base station, and a telecommunications terminal used by the system. The terms "marine" and "sea" as termed in this specification are defined to apply conceptually also to other bodies of water such as lakes.

In order to achieve the object, this invention provides a system for building marine telecommunications network to communicate from one of boats navigating on sea to a base station on land with a telecommunications terminal mounted on each of the boats; wherein the telecommunications terminal is configured to build the telecommunication network to establish a communication paths enabling mutual communication between one of the boats that exists out of the communication range with the base station and other of the boats that exists within the communication range such that the one of the boats communicates with the base station.

DETAILED DESCRIPTION OF THE INVENTION

Embodiments for implementing the marine telecommunications network building system and telecommunications terminal for small boats are explained with reference to the attached drawings in the following.

First Embodiment

Figure 1:
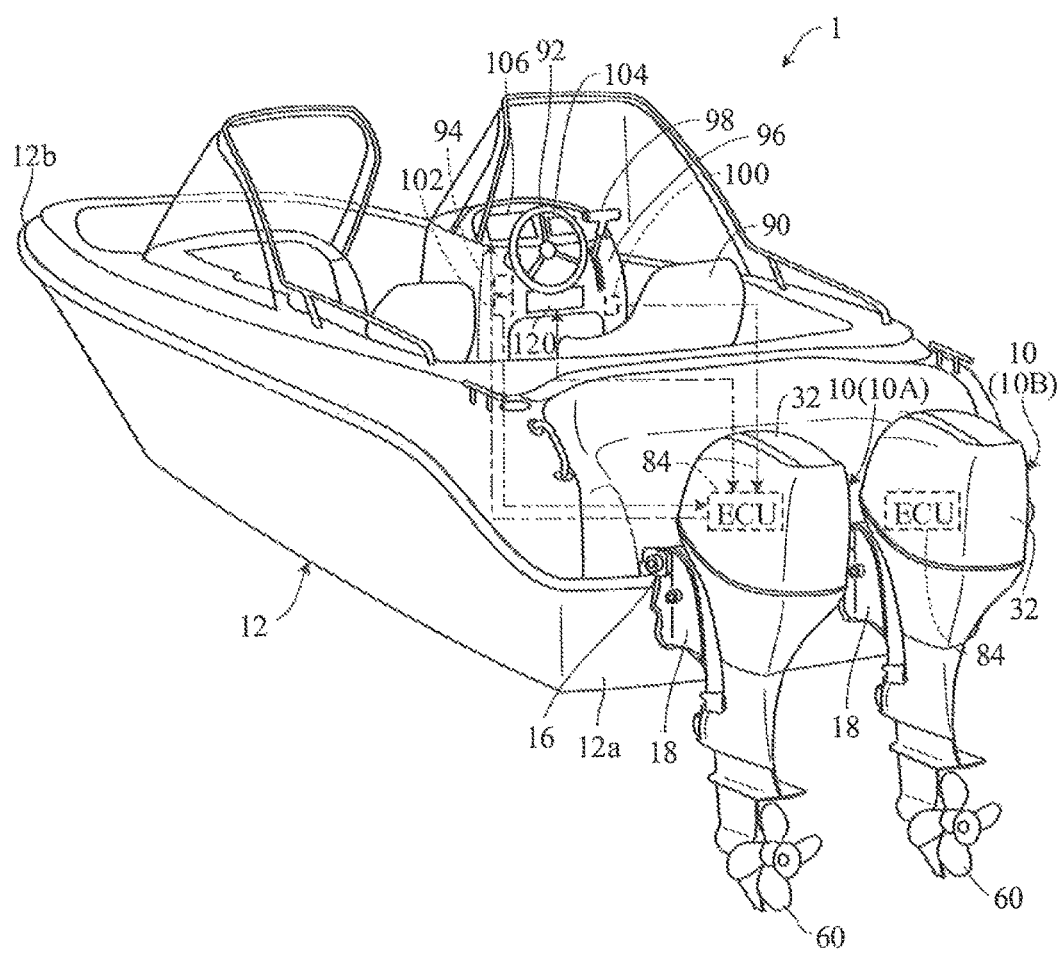
FIG. 1 is an external perspective diagram of an example of a marine telecommunications network building system and a telecommunications terminal for small boats according to an embodiment of this invention, viewed obliquely from behind.
Figure 2:
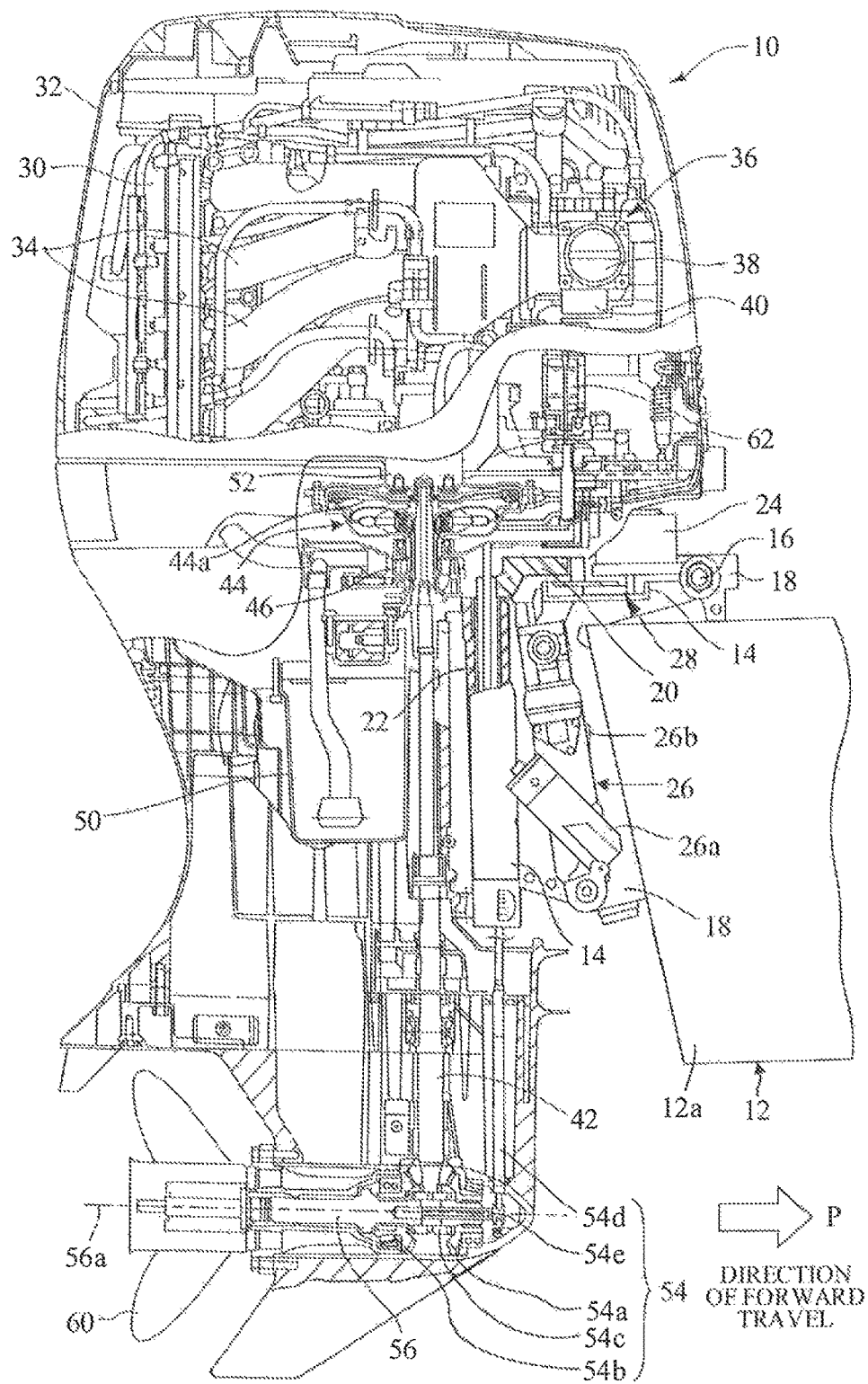
FIG. 2 is an enlarged side view (partially in section) of an outboard motor mounted on a small boat of FIG. 1.
Figure 3:
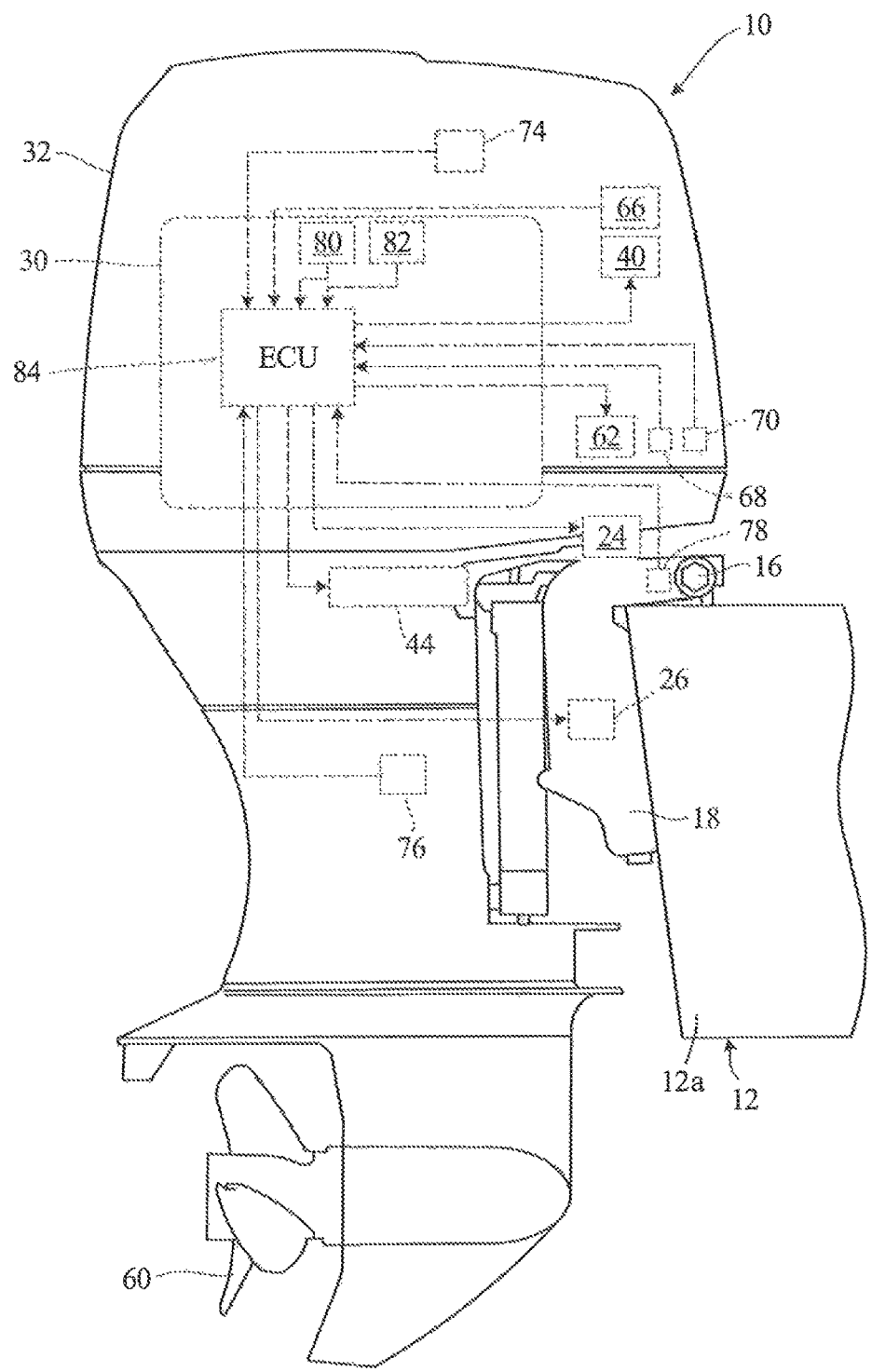
FIG. 3 is an explanatory diagram of an essential part of the outboard motor of FIG. 2.

FIG. 1 is an external perspective diagram of a small boat incorporating the marine telecommunications network building system and telecommunications terminal according to a first embodiment of this invention, viewed obliquely from behind; FIG. 2 is an enlarged side view (partially in section) of an outboard motor mounted on the small boat of FIG. 1; and FIG. 3 is an explanatory diagram of an essential part of the outboard motor.

Reference numeral 1 in FIG. 1 designates a small boat of the type commonly called a motorboat. As termed in this specification, "small boat" refers to a boat of less than 20 gross tons.

The small boat (called simply "boat" hereinafter) 1 shown in FIG. 1 is a so-called dual motor boat (even number of motors) that has twin outboard motors 10 mounted at a stern 12a of a hull 12 (or boat 1). In FIG. 1, the outboard motor on the left side (port side) relative to direction of forward travel is designated "first outboard motor 10A," with A appended as a subscript, and the outboard motor on the right side (starboard side) relative to direction of forward travel is designated "second outboard motor 10B," with B appended as a subscript. However, as the first outboard motor 10A and the second outboard motor 10B are identically structured outboard motors, they are explained in the following as outboard motor 10 with the subscripts A and B omitted.

As shown in FIGS. 1 and 2, the outboard motor 10 has a swivel case 14 and a tilting shaft 16 by which it is attached through a stern bracket 18 to the stern 12a of the hull 12. A bow of the hull 12 (or boat 1) is designated by symbol 12b.

The outboard motor 10 is equipped with a mount frame 20 and a swivel shaft 22, and since the swivel shaft 22 is accommodated inside the swivel case 14 to be rotatable around a vertical axis, the outboard motor 10 is rotatable with respect to the hull 12 around the vertical axis. The upper and lower ends of the mount frame 20 are fastened to a frame (not shown) constituting a body of the outboard motor 10.

An electric steering motor 24 for driving the swivel shaft 22 and a power tilt-trim unit 26 for regulating tilt angle and trim angle of the outboard motor 10 with respect to the hull 12 are installed near the swivel case 14. An output shaft of the electric steering motor 24 is connected through a reduction gear mechanism 28 to an upper end of the mount frame 20. Specifically, a configuration is adopted by which rotational output of the electric steering motor 24 is transmitted through the reduction gear mechanism 28 to the mount frame 20, thereby enabling clockwise and counterclockwise rotation of the outboard motor 10 around a vertical axis, i.e., around the swivel shaft 22, as a steering axis. This steers the forward travel direction of the boat 1 (hull 12) starboard and port.

The power tilt-trim unit 26 is integrally equipped with a hydraulic cylinder mechanism 26a for adjusting tilt angle and a hydraulic cylinder mechanism (trim actuator) 26b for adjusting trim angle (rotation angles of the outboard motor 10 around the tilting shaft 16 constituted as a horizontal shaft in the width direction of the hull 12 as its axis of rotation). And the swivel case 14 is rotated around a horizontal axis (pitch axis) perpendicular to the vertical axis using the tilting shaft 16 as its axis of rotation by supplying (discharging) hydraulic oil to (from) and extending/contracting the hydraulic cylinder mechanisms 26a and 26b. As a result, a structure is established by which the outboard motor 10 can be tilted up/down and trimmed up/down.

An engine (internal combustion engine) 30 is built into (mounted in) an upper portion of the outboard motor 10. The engine 30 is a spark-ignition, water-cooled gasoline engine. The engine 30 is enclosed by an engine cover 32 and positioned above the water surface.

A throttle body 36 is connected to an air intake pipe 34 of the engine 30. The throttle body 36 has an internal throttle valve 38 and an integrally attached throttle electric motor (throttle actuator) 40 for opening/closing the throttle valve 38.

An output shaft of the throttle electric motor 40 is connected to the throttle valve 38 through a reduction gear mechanism (not shown) installed adjacent to the throttle body 36. Engine speed is regulated by operating the throttle electric motor 40 to open and close the throttle valve 38 and thereby control air intake volume of the engine 30.

The outboard motor 10 is equipped with a driveshaft (vertical shaft) 42 rotatably supported parallel to the vertical axis, a torque converter 44 interposed between the engine 30 and the driveshaft 42, a hydraulic pump 46 for delivering hydraulic oil attached to the driveshaft 42, and a reservoir 50 for storing hydraulic oil.

Driven by the engine 30, the hydraulic pump 46 pumps hydraulic oil from the reservoir 50 and supplies hydraulic oil to, inter alia, lubrication sites of the engine 30, the hydraulic cylinder mechanisms 26a and 26b of the power tilt-trim unit 26, and a lock-up mechanism 44a of the torque converter 44.

In the outboard motor 10, a propeller shaft 56 supported to be rotated through a shift mechanism 54 including a bevel gear mechanism is supported at a lower end of the driveshaft 42 rotated by the engine 30 to be rotatable around a horizontal axis, whereby it can lie substantially parallel to the travel direction of the hull 12. A crankshaft 52 of the engine 30 is connected through the torque converter 44 to an upper end of the driveshaft 42. In initial state of the power tilt-trim unit 26, the propeller shaft 56 is oriented with its axis 56a lying substantially parallel to the direction of travel of the hull 12. A propeller 60 is attached to one end of the propeller shaft 56.

The shift mechanism 54 comprises, inter alia, a forward bevel gear 54a and a reverse bevel gear 54b connected to and rotated by the driveshaft 42, and a clutch 54c that enables the propeller shaft 56 to engage with either the bevel gear 54a or the reverse bevel gear 54b.

A shift electric motor 62 for driving the shift mechanism 54 is installed inside the engine cover 32, and an output shaft thereof is connectible through a reduction gear mechanism (not shown) with an upper end of a shift rod 54d of the shift mechanism 54. By operating the shift electric motor 62 to suitably vary position of the shift rod 54d and a shift slider 54e, the clutch 54c is operated to switch shift position between forward, reverse and neutral.

When the shift position is forward or reverse, rotation of the driveshaft 42 is transmitted through the shift mechanism 54 to the propeller shaft 56, whereby the propeller 60 is rotated to produce thrust in the forward or rearward direction of the hull 12. Direction of travel of the hull 12 when the shift position is forward is the direction indicated by arrow F in FIG. 2. Moreover, a battery or other power supply unit (not illustrated) attached to the engine 30 of the outboard motor 10 supplies operating power to energizing circuits (not shown) of the electric motors 24, 40 and 62.

Turning next to an explanation of sensors with reference to FIG. 3, a throttle position sensor 66 disposed near the throttle valve 38 shown in FIG. 2 produces an output proportional to opening angle of the throttle valve 38 (throttle opening). A shift position sensor 68 disposed near the shift rod 54d shown in FIG. 2 outputs a signal corresponding to shift position (neutral, forward or reverse), and a neutral switch 70 is also installed that outputs an ON signal when the shift position is neutral and an OFF signal when the shift position is forward or reverse.

A crankangle sensor 74 attached near the crankshaft 52 of the engine 30 shown in FIG. 2 outputs a pulse signal indicative of engine speed every predetermined crank angle. Further, a driveshaft rotational speed sensor 76 attached near the driveshaft 42 outputs a signal indicative of rotational speed of the driveshaft 42. A trim sensor (rotation angle sensor) 78 disposed near the swivel case 14 produces an output corresponding to trim angle of the outboard motor 10.

A GPS (Global Positioning System) receiver 80 is installed at an appropriate of the outboard motor 10 and receives a GPS signal indicating the position of the boat 1 sent from satellites, and a direction sensor 82 is installed at an appropriate location of the outboard motor 10 and produces an output indicating the direction (orientation) of the boat 1.

The outputs of the aforesaid sensors and switch are sent to an electronic control unit (ECU) 84 mounted on the outboard motor 10. The ECU 84, which is a microcomputer having a CPU (processor) 84a, ROM 84b, RAM 84c and other components, is disposed (mounted) inside the engine cover 32 of the outboard motor 10 and integrally controls operation of the outboard motor 10. The ECU 84 detects the current position, running (navigation) speed and direction of the boat 1.

As shown in FIG. 1, a steering wheel 92 rotatable by the boat operator is installed near an operator's seat 90 of the hull 12. A steering angle sensor 94 attached to a shaft (not shown) of the steering wheel 92 outputs a signal corresponding to steering angle of the steering wheel 92 operated by the boat operator.

A shift-throttle lever 98 installed to be operable by the boat operator is provided on a dashboard 96 at the operator's seat 90. The shift-throttle lever 98, which is swingable back and forth from an initial position, is used by the boat operator to input shift commands and engine speed regulation commands. A lever position sensor 100 attached near the shift-throttle lever 98 outputs a signal corresponding to the position to which the boat operator operates the shift-throttle lever 98.

A power tilt-trim switch 102 provided near the operator's seat 90 to be manually operable by the boat operator for inputting outboard motor 10 tilt angle and trim angle adjust instructions outputs signals indicative of the outboard motor 10 tilt angle up/down and trim angle up/down commands input by the boat operator.

Navigation instruments 104 including gauges and meters indicating running speed and so for and a compass and a display 106 are provided on the dashboard 96 near the operator's seat 90. The display 106 has a screen that displays x, y coordinate plane defined by x-axis (pitch axis) indicating the right and left (lateral) direction of the boat 1 and y-axis (roll axis) indicating the direction of advance of the boat 1 on which the position and direction of the boat 1 obtained from the outputs of the GPS receiver 80 and direction sensor 82.

Outputs of the steering angle sensor 94, lever position sensor 100 and power tilt-trim switch 102 are also inputted to the ECU 84. Based on the outputs of the aforesaid sensors and switch, the ECU 84 controls operation of the different electric motors. As a result, steering is performed in accordance with steering angle of the steering wheel 92 and trim angle is adjusted by operating the power tilt-trim unit 26.

Although the foregoing explanation of the outboard motor 10 relates to the first outboard motor 10A, the same also applies to the second outboard motor 10B. The ECU 84 of the first outboard motor 10A and the ECU 84 of the second outboard motor 10B are wire-connected (as indicated by a one-dot-dashed line in FIG. 1) and configured to be communicable with each other.

In addition, a telecommunications terminal 120 for wireless data (digital signal) telecommunication is mounted on the dashboard 96 near the operator's seat 90. This telecommunications terminal 120 builds the marine telecommunications network according to this invention and functions to communicate with a land base station through the telecommunications network to access a cloud or other server. The telecommunications terminal 120 and the ECU 84 of the outboard motor 10 are wire connected and can communicate with each other.

The telecommunications terminal 120 is for wireless data telecommunication over relatively short distances (e.g., several hundred meters to several kilometers at sea), and is a telecommunications terminal for data communication by, for example, wireless LAN (such as Wi-Fi or Zigbee) complying to IEEE 802.11 series standards, Bluetooth complying to IEEE 802.15.1 standards, or extended Bluetooth 5 standards. Therefore, the telecommunications terminal 120 does not include satellite telephone equipment, shortwave long-distance analog communication equipment like amateur wireless equipment, a high-power wireless terminal, or the like. In this embodiment, a maximum communication range of 3 km is assumed in the telecommunications terminal 120.

Figure 4:
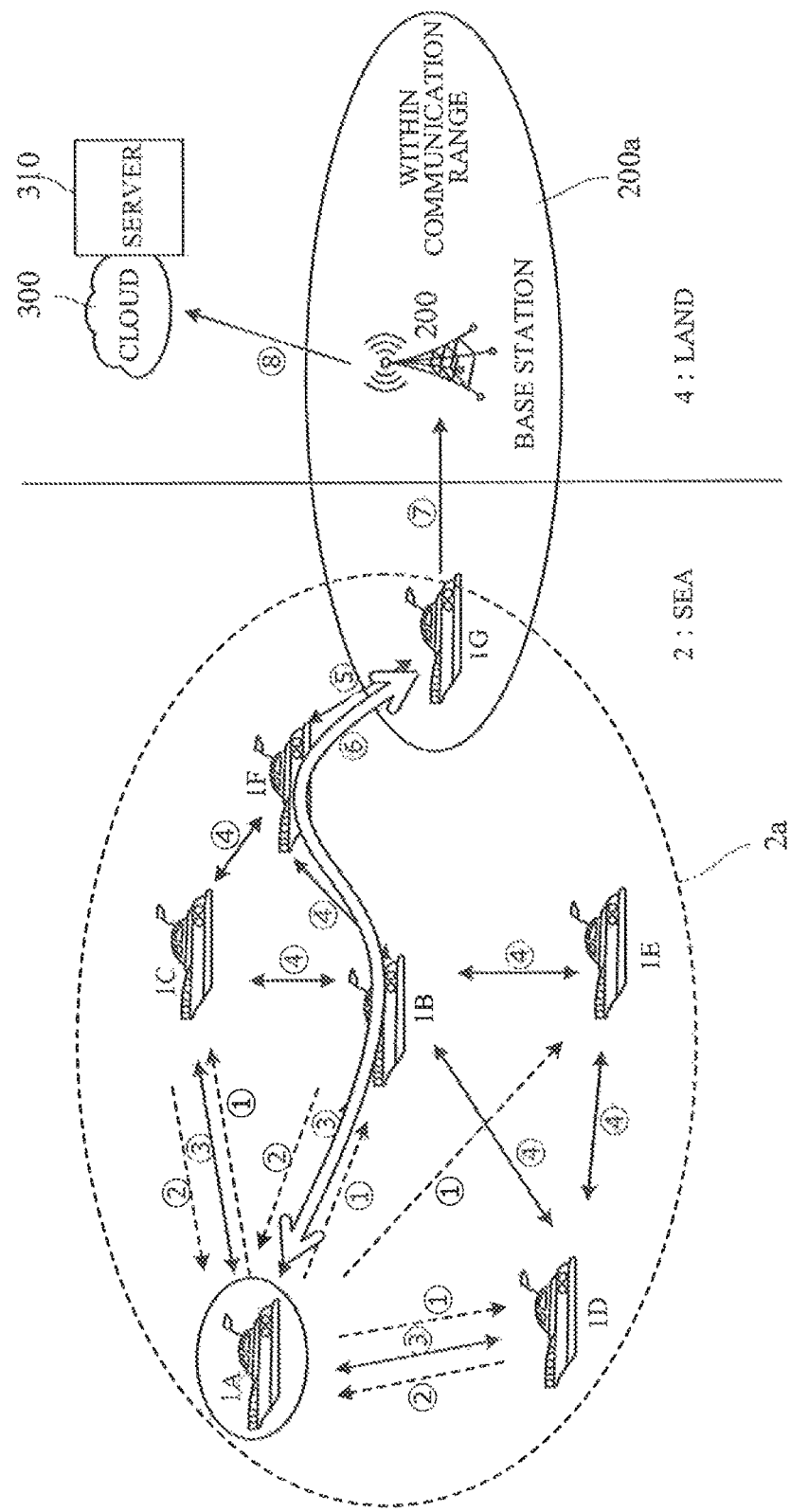
FIG. 4 is a conceptual diagram for explaining a marine telecommunications network building system for small boats according to this embodiment of the present invention.

FIG. 4 is a conceptual diagram for explaining a system of building a marine telecommunications network according to the embodiment of this invention.

In the embodiment shown in FIG. 4, multiple boats 1A-1G, assumed to be taxi-boats, rental boats or the like, are shown freely navigating in a predetermined sea area 2a on sea 2. The boats 1A-1G are small boats like the boat 1 explained with reference to FIGS. 1 to 3, but they are not limited to boats fitted with dual outboard motors and can instead be boats fitted with a single outboard motor or with three outboard motors. Other configuration features are also not limited to those described in the foregoing.

The aforesaid telecommunications terminal 120 capable of bidirectional wireless data communication is mounted onboard each of the boats 1A-1G Further, a base station 200 enabling access via the Internet to a server 310 on a cloud 300 is installed on land 4. However, a communication range 200a within which the telecommunications terminal 120 can communicate with the base station 200 covers only part of the predetermined sea area 2a.

This invention is therefore applied by using the telecommunications terminals 120 for wireless data communication mounted onboard the boats 1A-1G of a boat group comprising multiple small boats ("subject (own) boat" and "other boats" from the viewpoint of any given boat) navigating on sea 2 to build a telecommunications network for communicating from any (subject) boat to the base station 200 on land 4. (In the following explanation, reference numeral 120 affixed to "telecommunications terminal" is sometimes omitted.)

In the example of FIG. 4, only the boat 1G among the boats 1A-1G of the group of boats is inside the communication range 200a with the base station 200, and the telecommunications network for communication with the base station 200 is in this example built assuming the boat 1A most distant from the base station 200 to be the subject boat.

The telecommunications terminal of the boat 1A broadcasts a connect-request command requesting connection to the base station 200. In FIG. 4, the connect-request command is denoted by a dashed arrow and an encircled numeral "1". The telecommunications terminals of the boats 1A-1G are identified by mutually unique IDs, and each connect-request command is appended with the ID of the telecommunications terminal that transmitted it (called the "transmit source"). Alternatively, instead of broadcasting the connect-request command, the telecommunications terminal of the subject boat can sequentially transmit it to nearby boats on the side closer to land 4 (designating their addresses).

Then the telecommunications terminals (receive destinations) of the other boats that were able to receive the connect-request command (in FIG. 4, the boats 1B, 1C and 1D) transmit connect-request OK responses to the telecommunications terminal of the boat 1A that is the transmit source of the connect-request command. The IDs of the receive destination telecommunications terminals are attached to the responses. In FIG. 4, the connect-request OK responses are denoted by dashed arrows and encircled numerals "2".

The reception of the responses by the telecommunications terminal of the boat 1A establishes communication paths enabling mutual communication between the telecommunications terminal of the boat 1A and the telecommunications terminals of the boats 1B, 1C and 1D. In FIG. 4, these communication paths are denoted by solid double-headed arrows and encircled numerals "3".

Simultaneously with this, the telecommunications terminals (receive destinations) of the boats 1B, 1C and 1D that received the connect-request command requesting connection to the base station 200 next become transmit sources that in the same way as described above transmit connect-request commands requesting connection to the base station 200. Then, among the telecommunications terminals that received the connect-request command from the telecommunications terminal of the boat 1B, those of the boats other than the boat 1A with which a communication path is already established, namely, those of the boats 1C, 1D, 1E and 1F, transmit connect-request OK responses to the telecommunications terminal of the boat 1B that is the transmit source.

The reception of the responses by the telecommunications terminal of the boat 1B establishes communication paths enabling mutual communication between the telecommunications terminal of the boat 1B and the telecommunications terminals of the boats 1C, 1D, 1E and 1F. Communication paths enabling mutual communication are also similarly established between the telecommunications terminal of the boat 1C and the telecommunications terminal of the boat 1F, and between the telecommunications terminal of the boat 1D and the telecommunications terminal of the boat 1E. In FIG. 4, establishment of these communication paths is denoted by solid double-headed arrows and encircled numerals "4".

In addition, the telecommunications terminal of the boat 1F that received the connect-request command requesting connection to the base station 200, next becomes a transmit source that in the same way as described above transmits a connect-request command. The telecommunications terminal of the boat 1G receives this and transmits a connect-request OK response to the telecommunications terminal of the boat 1F that is the transmit source. The reception of this by the telecommunications terminal of the boat 1F establishes a communication path enabling mutual communication between the telecommunications terminal of the boat 1F and the telecommunications terminal of the boat 1G. In FIG. 4, this is denoted by a solid double-headed arrow and an encircled numeral "5".

In this manner, the telecommunications terminal of the boat 1A, the subject boat, can build a network among telecommunications terminals of other boats, including at least the boat 1G which is present within communication range with the base station 200 on land, namely, among the telecommunications terminal of the boats 1B, 1F and 1G; and establishes communication paths enabling mutual communication. In FIG. 4, this is denoted by a thick solid-line double-headed arrow and an encircled numeral "6".

And the telecommunications terminal of the boat 1A, the subject boat, communicates with the base station 200 on land through this established communication path and can, in addition, access the server 310 on the cloud 300. In FIG. 4, this is denoted by solid arrows and encircled numerals "7" and "8".

Also in the following, it is the telecommunications terminals mounted on the boats that actually do the communicating, but to avoid complexity of description the term "telecommunications terminal" is sometimes omitted and the explanation is for convenience made as if the communicating is done by the boats.

In this embodiment, a telecommunications network is built as described above, thereby enabling the subject boat 1A to communicate with the base station 200 via a communication path using the boats 1B, 1F and 1G as relay points and to upload to the server 310 on the cloud 300 navigation data such as the subject boat's current position, running speed and direction, state of the outboard motor 10, and the like. In addition, the boat 1A can request and download from the server 310 data required for navigation, such as wind, sea current and other meteorological data, danger spot data, and so on.

In the example of FIG. 4, the boat 1A can also communicate with the base station 200 via a communication path using the boats 1C, 1F and 1G as relay points and via a communication path using the boats 1D, (1E,) 1B, 1F and 1G as relay points. Further, in this embodiment, all of the boats 1A-1G constituting the group of boats establish a communication path enabling mutual communication with at least one other boat, and all of the boats build networks enabling mutual communication directly or via other boats (relay points). Therefore, any and every boat can establish a communication path from itself to the boat 1G present within communication range with the base station 200 on land. In addition, the boats 1A-1G can mutually communicate with one another.

The same applies when one of the boats 1B-1F other than the boat 1A becomes the subject boat and begins to build a telecommunications network. However, it is not necessary to establish a telecommunications network among all of the boats 1A-1G of the group of boats. It suffices to establish at least a communication path between the subject boat and the boat 1G present within communication range with the base station 200.

The number of boats constituting the group of boats is arbitrary, the size of the predetermined sea area 2a in which the boats navigate is also arbitrary, and the individual boats of the group move about by navigating. However, the predetermined sea area 2a only partially overlaps the range 200a within which communication with the base station is possible, so that at least one boat must always be present within the range 200a. That boat can be replaced by another.

In this embodiment, as stated above, communication networks (fleet networks) are built that enable every boat of the group of boats (fleet) navigating on the sea 2 to communicate with the base station 200 and also enable mutual communication among individual boats, whereby the following effects are realized.

Even if a boat is navigating in a sea area outside the communication range with the base station 200, it can create a simulated in-range region as necessary, whereby cost is low because a high-power wireless terminal is unnecessary and real-time data exchange with the base station 200 is possible even far from land. Moreover, since multiple access routes are formed from the subject boat to a boat within range, data transmission speed can be increased and communication redundancy and stability can be enhanced.

Areas in which a simulated in-range region can be formed can be estimated from the running directions and speeds of surrounding boats, and a warning can therefore be issued when departure from the fleet network is likely. Alternatively, running speed and direction of the boat can be controlled to prevent departure from the fleet network. It is also possible to implement auto-navigation of the boat utilizing big data contained in the server 310 with which the base station 200 communicates.

Moreover, when fail safe (F/S) activates in one of the boats, a nearby boat can quickly come to its assistance. When a rescue boat is dispatched, it can complete its mission solely inside the fleet network.

Boats can exchange data regarding throttle opening, engine speed, steering angle, sea current direction, and the like. As a result, when, for example, a TA sensor (intake air temperature sensor) or other input device of a boat fails, the boat can improve precision of an alternative value adopted by using the input value of the nearest other boat.

Moreover, boats traversing the same route can optimize their route by the lead boat supplying them with data regarding sea currents and other factors affecting navigation. Data transfer can be divided into send/receive by data group, time group, boat group and so on.

Figure 5:
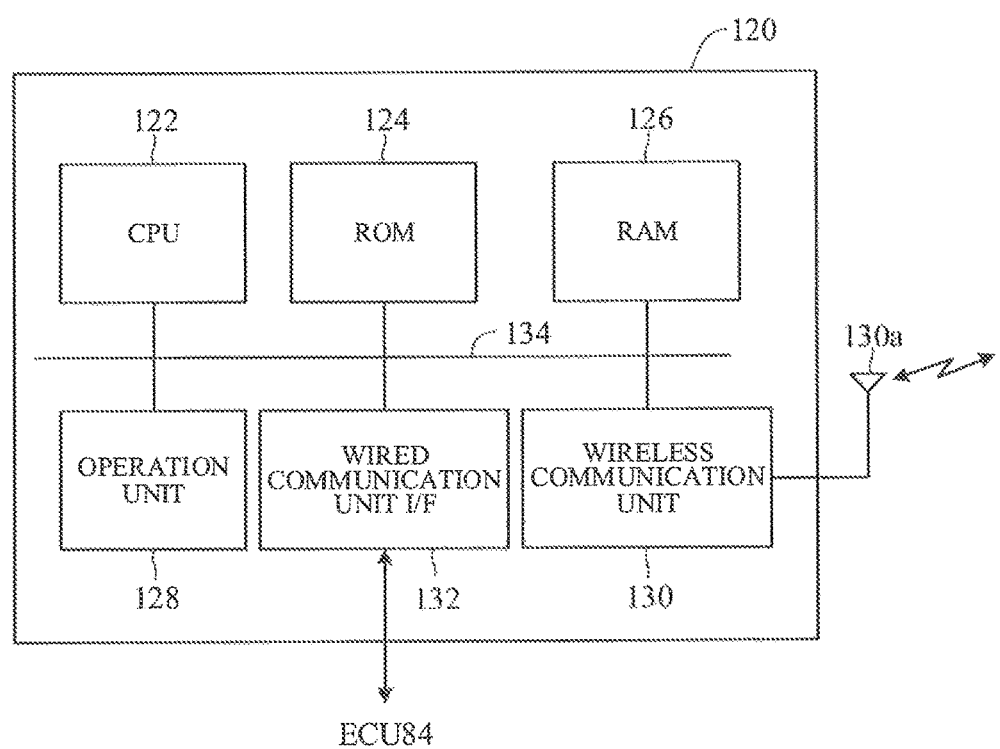
FIG. 5 is a block diagram showing a hardware configuration example of a telecommunications terminal mounted on the boat(s) of FIGS. 1 and 4.
Figure 6:
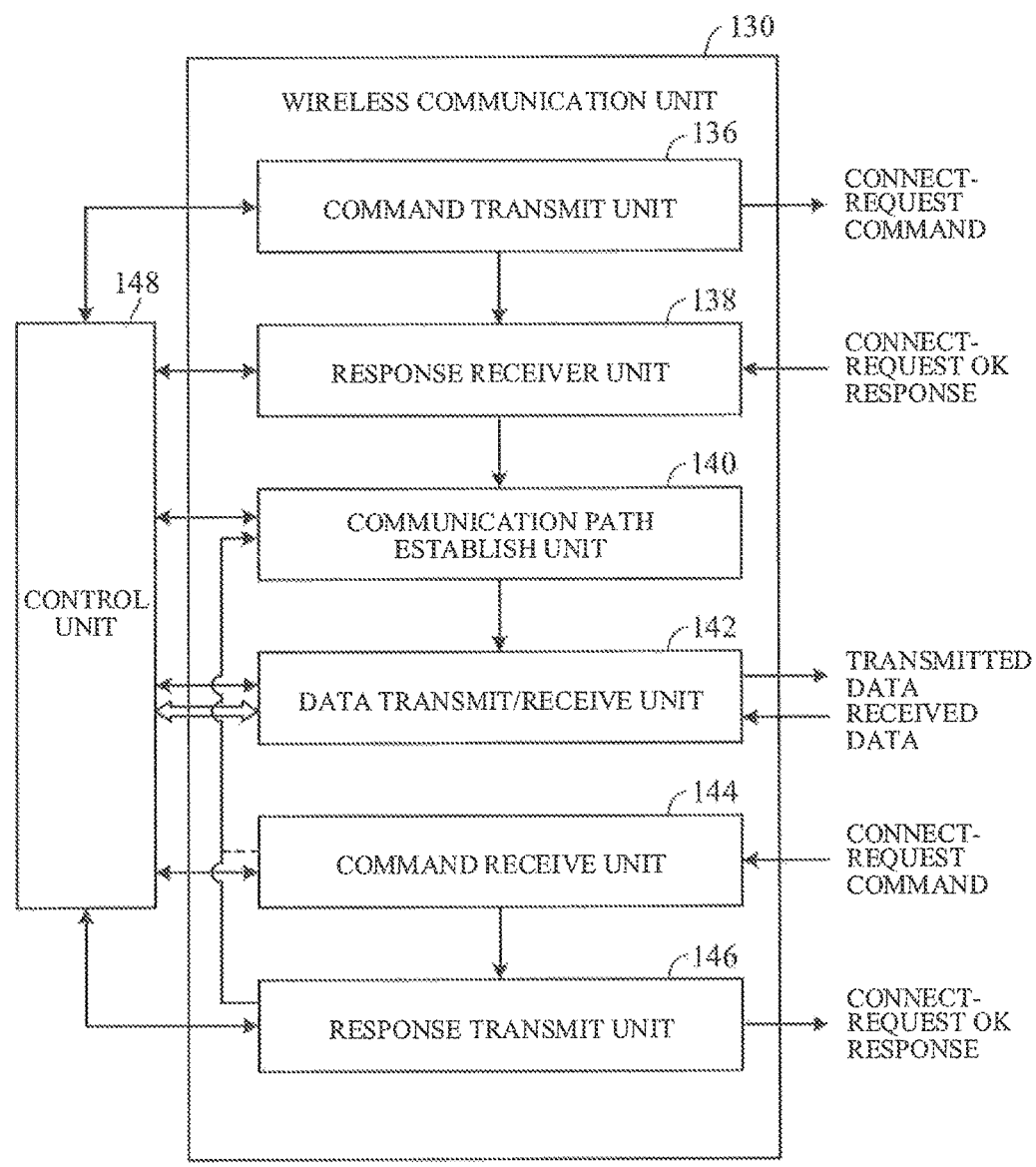
FIG. 6 is a block diagram showing a functional configuration example of a wireless communication unit shown in FIG. 5.
Figure 7:
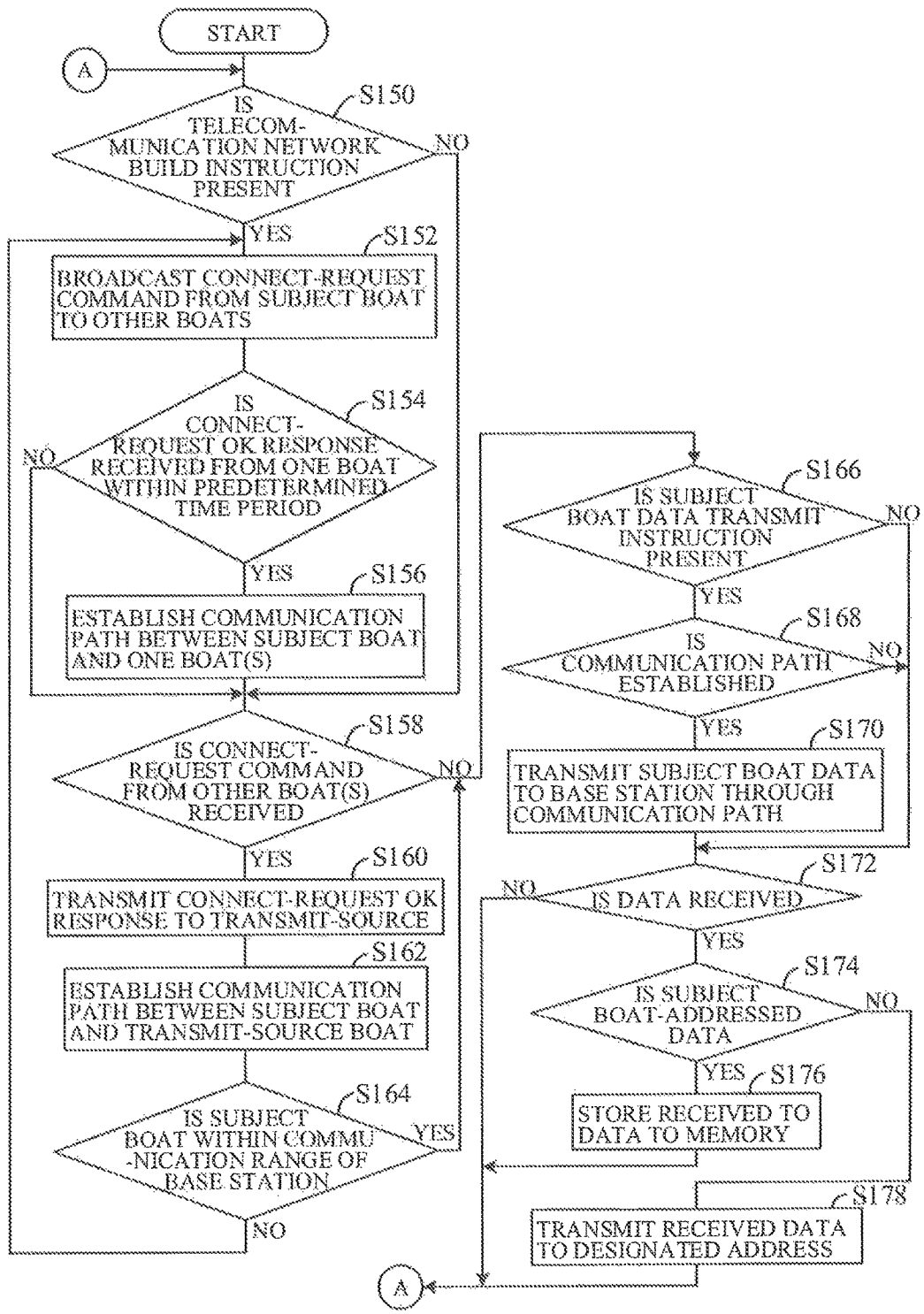
FIG. 7 is a flowchart showing operation of the telecommunications terminal shown in FIGS. 5 and 6.

The telecommunications terminal for implementing this invention is explained next. FIG. 5 is a block diagram showing a hardware configuration example of the telecommunications terminal 120 mounted onboard the boat of FIG. 1. FIG. 6 is a block diagram showing a functional configuration of a wireless telecommunications unit 130 in FIG. 5. FIG. 7 is a flowchart showing flow of operations according to this invention performed by the telecommunications terminal 120 shown in FIGS. 5 and 6.

As shown in FIG. 5, the telecommunications terminal 120 comprises a microcomputer including, inter alia, a CPU (Central Processing Unit) 122, ROM 124 serving as program memory, and RAM 126 serving as data memory. It is additionally equipped with an operation unit 128, the wireless telecommunications unit 130, and a wired communications I/F 132, which can intercommunicate through a CPU bus 134.

The operation unit 128 has operator-operated switches, keys and the like and a display for displaying operating state and so on of the telecommunications terminal 120. The wireless telecommunications unit 130, which has an antenna 130a, is a unit for wireless data communication via wireless LAN with the telecommunications terminals of other boats and with the base station. The wired communications I/F 132 is an interface for exchanging various data by wired communication with the ECU 84 of the outboard motor 10 shown in FIGS. 1 and 3.

An explanation follows with reference to FIG. 6 of the functional configuration of the wireless telecommunications unit 130 in the telecommunications terminal 120. As shown in FIG. 6, the wireless telecommunications unit 130 is equipped with a command transmit unit 136, a response receive unit 138, a communication path establish unit 140, a data transmit/receive unit 142, a command receive unit 144 and a response transmit unit 146, and these are controlled by a control unit 148. The control unit 148 corresponds to the function of the microcomputer comprising the CPU 122, ROM 124, RAM 126 and the like shown in FIG. 5.

When the subject boat begins to build a telecommunications network, its command transmit unit 136 transmits a connect-request command requesting connection to the base station, by broadcasting so that it can be received by any boat telecommunications terminal within communication range. Alternatively, it can sequentially transmit the command to nearby boats on the side closer to land 4 than the subject boat, designating their addresses.

The command transmit unit 136 also similarly transmits a connect-request command requesting connection to the base station when the command receive unit 144 of the subject boat receives a connect-request command transmitted by the telecommunications terminal of another boat. IDs identifying the transmit source are appended to these connect-request commands.

After the command transmit unit 136 transmits a connect-request command, the response receive unit 138 receives connect-request OK responses transmitted from the telecommunications terminals of other boats. When a response is received, the transmit source (receive destination of the connect-request command) is identified from the appended ID and sent to the communication path establish unit 140. The communication path establish unit 140 establishes a communication path enabling mutual communication with the telecommunications terminal of the transmit source boat and stores its ID in memory.

When the response receive unit 138 receives multiple responses within a predetermined time period, it sequentially sends the IDs to the communication path establish unit 140, and the communication path establish unit 140 sequentially establishes communication paths to the telecommunications terminals of the transmit source boats and stores their IDs in memory together with the order in which the communication paths were established. Earlier established communication paths can therefore be used preferentially.

The data transmit/receive unit 142 transmits various base station-addressed subject boat data prepared by the control unit 148 in communication with the ECU 84 through a communication path established by the communication path establish unit 140. Moreover, it receives through the established communication path and delivers to the control unit 148 various subject boat-addressed data transmitted from the base station.

When another boat begins to build a telecommunications network, the command receive unit 144 of the subject boat receives the connect-request command requesting connection to the base station transmitted by the telecommunications terminal of the other boat, identifies the transmit source from the ID appended to the connect-request command, and informs the response transmit unit 146 of the identified transmit source. Upon receiving this information, the response transmit unit 146 transmits a connect-request OK response to the transmit source identified from the ID.

The command receive unit 144 or response transmit unit 146 then sends the ID to the communication path establish unit 140, whereafter the communication path establish unit 140 establishes a communication path enabling mutual communication with the telecommunications terminal of the transmit source indicated by the ID and stores the ID in memory. The control unit 148 integrally controls the aforesaid units.

There now follows an explanation with reference to the flowchart of FIG. 7 of the flow of operations according to this invention performed by the telecommunications terminal 120 configured as set out in the foregoing. In FIG. 7 and in the ensuing explanation the term "processing step" is abbreviated to "S". Moreover, in FIG. 7, determination results of the processing are expressed as "YES" when affirmative and "NO" when negative. The terminal symbols "A" appearing in two places indicate flowline continuation.

When the power switch of the telecommunications terminal 120 is turned ON and the operation of the telecommunications terminal 120 commences, first, in S150, presence of a telecommunications network build instruction is determined. Building of a subject boat's telecommunications network starts when the operator instructs to this effect by, for example, pressing a build-start button of the operation unit 128 shown in FIG. 5. In S150 of FIG. 7, presence or not of an instruction is checked and determined by the control unit 148 shown in FIG. 6.

When presence of a telecommunications network build instruction is determined, the determination in S150 is YES, and the program goes to S152, in which a connect-request command requesting connection to the base station is appended with the subject boat's ID and transmitted. This transmission is preferably in the form of a broadcast so that it can be received by any boat telecommunications terminal within communication range, but can, as mentioned earlier, instead be a transmission designating a suitable address.

Next, in S154, it is determined whether a connect-request OK response is received from the telecommunications terminal of another boat within a predetermined time period, and when received, the determination in S154 is YES, and the program goes to S156. Then the transmit source (receive destination of the connect-request command) is identified from its appended ID, a communication path enabling mutual communication with the telecommunications terminal of the boat that transmitted the response is established and its ID is stored in memory.

This processing of S154 and S156 is repeated for a predetermined time period, and when multiple responses are received in the course of the processing, similar communication paths can be sequentially established between the telecommunications terminal of subject boat and those of the boats that sent the responses. In FIG. 7, the flow of this repeated processing is not illustrated. After elapse of the predetermined time period, the program goes to S158. Alternatively, the program can advance to S158 immediately after establishment of a communication path with the boat telecommunications terminal that is the transmit source of the first received response.

When no response is received within the predetermined time period in S154, the determination is NO and the program goes to S158. When a telecommunications network build instruction is determined in S158 not to be present, the determination in S150 is NO, and the program skips past S152-S156 to S158. S158-S164 relate to processing when another boat starts to build a telecommunications network.

In S158, it is determined whether a connect-request command requesting connection to the base station has been received, when not received, the determination is NO, and the program goes to S166, but when received, the result is YES, and the program goes to S160, in which a connect-request OK response is transmitted to the boat that is the transmit source of the connect-request command. The program then goes to S162, in which a communication path enabling mutual communication with the telecommunications terminal of the boat that is the transmit source of the connect-request command is established and the ID of its telecommunications terminal is stored in memory.

Next, in S164, position data of the subject boat are checked and it is determined whether the subject boat is within communication range with the base station. When the subject boat is within communication range, the determination is YES and the program goes to S166. When within communication range, it follows that a communication path with the base station is already established, so that there is no need to establish new communication paths with additional boats.

When the subject boat is not within range, the determination in S164 is NO and the program returns to S152, in which, as stated earlier, a connect-request command requesting connection to the base station is transmitted. When a response is thereafter received within the predetermined time period, a communication path is in S154 and S156 established to the boat that transmitted the response. The program then goes to S158, from where it goes to S166 if a connect-request command is not received and to S160 to repeat the aforesaid processing when one is received.

S166-S170 relate to processing when subject boat data are transmitted to the base station 200. First, in S166, presence or not of a subject boat data transmit instruction is determined. The operator can give a subject boat data transmit instruction through the operation unit 128 shown in FIG. 5. And it is additionally possible to issue a subject boat data transmit instruction automatically upon emergence of special data or, for example, at a preset time or after passage of a preset time period.

When a subject boat data transmit instruction is present, the determination in S166 is YES, the program goes to S168, in which it is determined whether a communication path is established. When a communication path is not established, the determination is NO and subject boat data cannot be transmitted to the base station, so the program skips past S170 to S172. When a communication path is established, the determination in S168 is YES, the program goes to S170 to transmit the subject boat data to the base station through the established communication path. The program then goes to S172.

When a subject boat data transmit instruction is not present, the determination in S166 is NO, the program skips past S168 and 170 to S172. S172-S178 relate to processing when data transmitted from the base station or data transmitted from another boat are received directly from the base station or via a communication path established with another boat. First, in S172, it is determined whether data have been received, and when data have been received, the determination is YES, and the program goes to S174. When data have not been received, the determination in S172 is NO, and the program returns to the initial S150.

In S174, it is determined whether the received data are subject boat-addressed data, and when subject boat-addressed data, the determination is YES, and the program goes to S176 to store the received data in memory, whereafter the program returns to the initial S150. Therefore, when subject boat-addressed data transmitted from the base station are received via an established communication path, the data can be retained.

When the received data are not subject boat-addressed data, the determination in S174 is NO. In this case, the received data are either base station-addressed data transmitted from another boat or other boat-addressed data transmitted from the base station, so the program goes to S178 to transmit (forward) the received data to the designated address. Namely, in such a case, data transmissions are relayed. Next, the program returns to the initial S150.

The telecommunications terminals 120 mounted on the boats 1 in this embodiment repeat the aforesaid processing until powered OFF. As the boats 1 making up the group of boats each navigates independently, their positional interrelation constantly changes. So when a boat is to transmit data to the base station or request the base station 200 to transmit data contained in the server, it is preferable for the boat to rebuild its telecommunications network beforehand. Although the telecommunications terminals of the boats that have established communication paths of course also otherwise communicate with one another, explanation of this aspect is omitted here.

Second Embodiment

On a related point, as explained with reference to FIG. 3, each of the boats 1 making up the group of boats is expected to be equipped with the GPS receiver 80, so that the ECU 84 can constantly detect its own boat's (the subject boat's) current position based on GPS signals indicating the boat's position transmitted from GPS satellites and received by the GPS receiver 80. However, if some boats are not equipped with GPS receivers, or have malfunctioning GPS receivers, these boats cannot know their own current positions.

In such a situation, if, as in the first embodiment explained with reference to FIG. 4, communication paths are established that enable mutual communication among the boats of the group, a boat unable itself to detect current position can nevertheless infer its current position data by having other nearby boats send it their position data. The second embodiment aims to this position inference.

Figure 8:
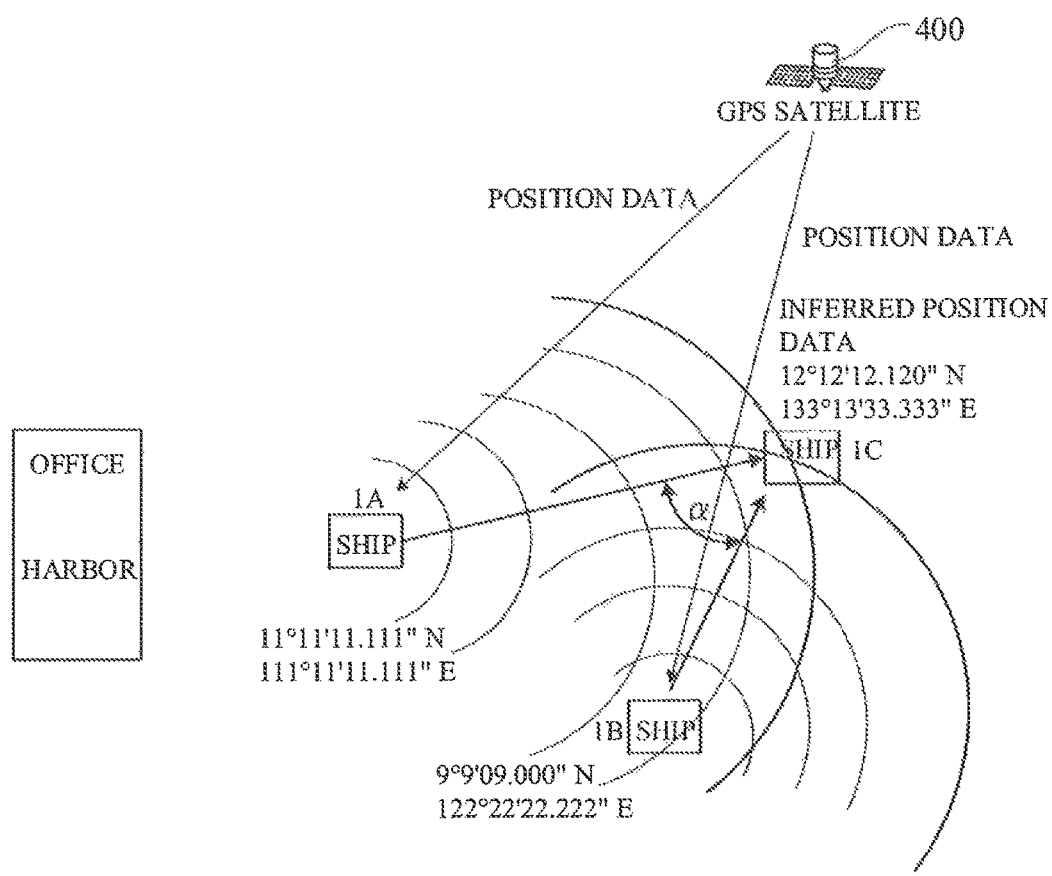
FIG. 8 is an explanatory diagram showing an example of boat position inference according to a second embodiment of the present invention.
Figure 9:
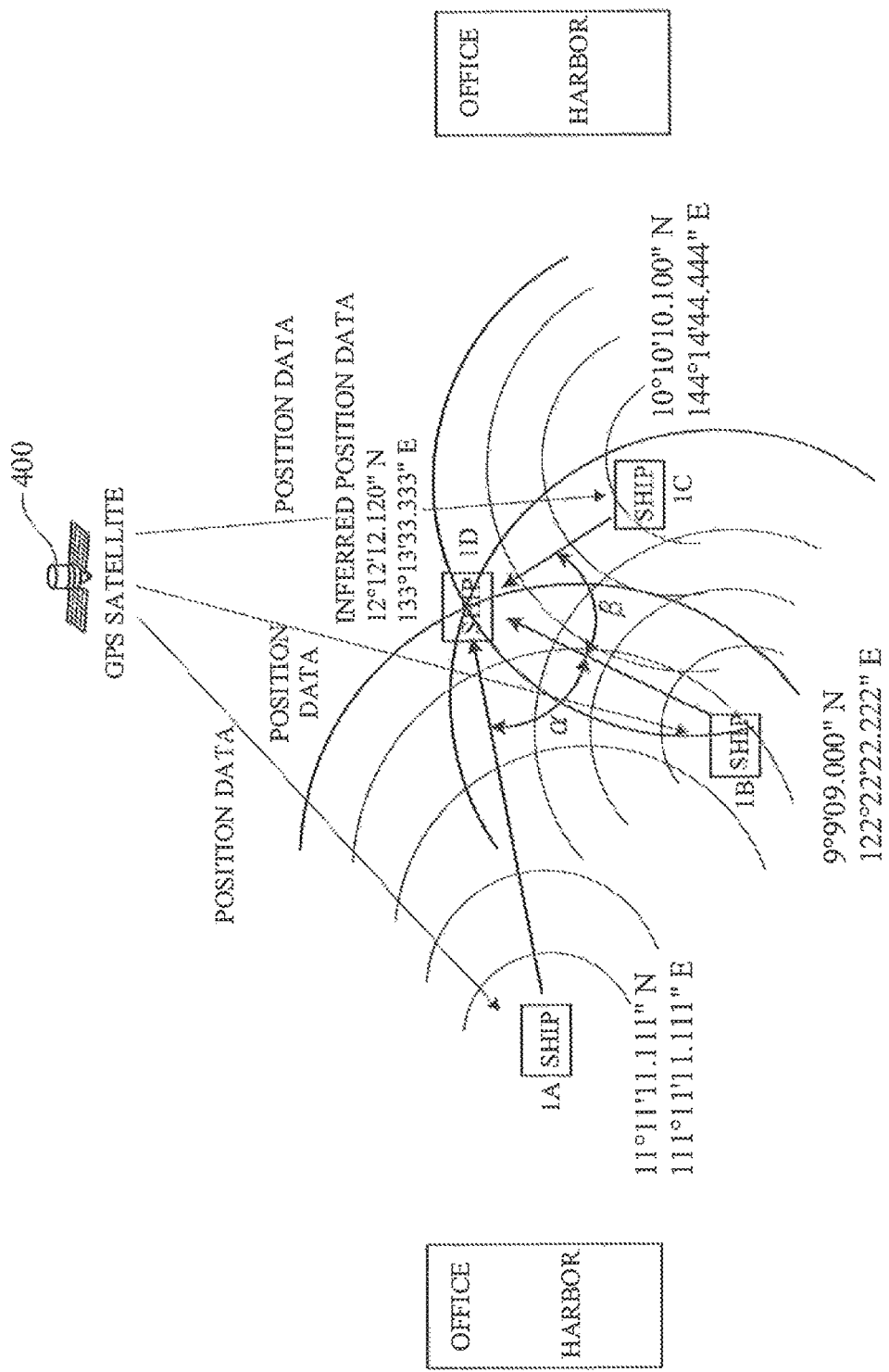
FIG. 9 is an explanatory diagram showing an example of boat position inference according to the second embodiment of the present invention.
Figure 10:
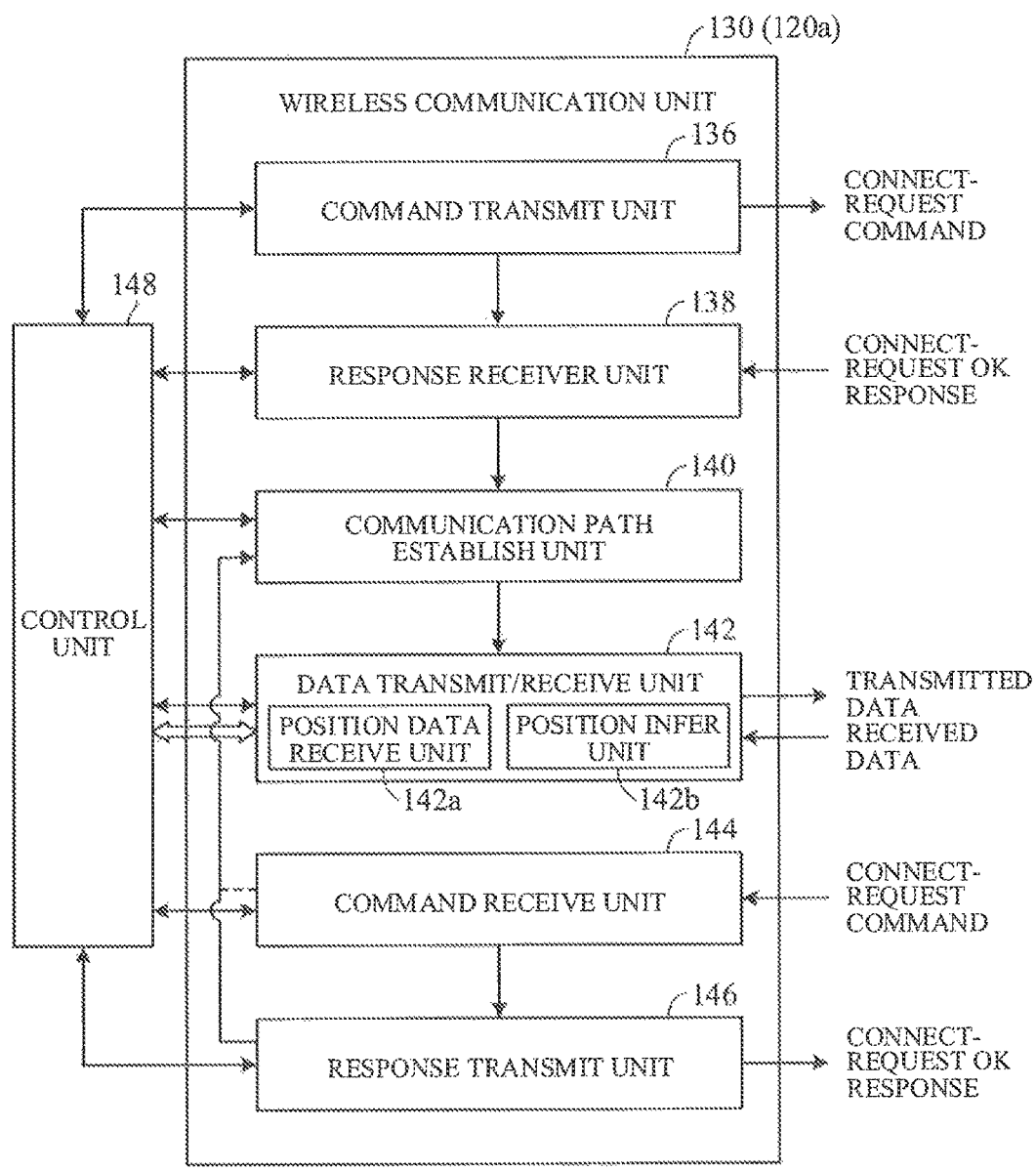
FIG. 10 is a block diagram, similar to FIG. 6, but showing a functional configuration example of a wireless communication unit in the second embodiment illustrated in FIGS. 8 and 9.

The second embodiment is explained with an example of such position data inference in the following. FIG. 8 is an explanatory diagram for explaining an example of position data inference and FIG. 9 is an explanatory diagram for explaining another example of position data inference. FIG. 10 is a block diagram, similar to FIG. 6, but showing a functional configuration example of a wireless communication unit in the second embodiment. FIGS. 8 and 9 and the ensuing explanation, the boats are assigned symbols 1A to 1C or 1A to D, similar to the boat 1 shown in FIG. 1 and the boats 1A-1G etc. shown in FIG. 4.

As shown in FIG. 10, the telecommunications terminal used in the second embodiment comprises a telecommunications terminal (120a) that has a directional antenna, and the data transmit/receive unit 142 of the telecommunications terminal 120a includes a position data receive unit 142a and a position infer unit 142, and the processing is executed by them. Specifically, at least the boats C and D shown in FIGS. 8 and 9 are provided with the telecommunications terminal 120a.

While it is actually the GPS receiver 80 that receives GPS signals from a GPA satellite 400, the ECU 84 that detects position data from the GPS signals, and the telecommunications terminal 120a that transmits the position data, the following explanation is, in the interest of simplicity, made as if these functions are performed by the boats that know their own position data. Likewise, it is the telecommunications terminal 120a that actually receives position data transmitted from the boats and infers current position data of the subject boat from respective position data and reception directions, but the following explanation is made as if these functions are performed by boats that do not know their own position data.

FIG. 8 shows an example in which the boat 1C that does not know its position data infers its own boat's (subject boat's) current position data using position data received from two nearby boats, namely, boat 1A and boat 1B.

Say, for example, that at a certain point in time, the boat 1A receives GPS signals from the GPS satellite, learns its current position to be 11° 11' 11.111" N and 111° 11' 11.111" E, and transmits these position data toward the boat 1C, and that at the same point in time, the boat 1B receives GPS signals from the GPS satellite, learns its current position to be 9° 9' 09.000" N and 122° 22' 22.222" E, and transmits these position data toward the boat 1C.

The boat 1C receives the position data from both the boat 1A and the boat 1B with the telecommunications terminal 120a having a directional antenna, and by using these sets of position data and angle difference α between the reception directions (known from rotation angle difference of the directional antenna) can infer its own current position data to be, for example, 12° 12' 12.120" N and 133° 13' 33.333" E.

FIG. 9 shows another example in which the boat 1D that does not know its position data infers its own boat's (subject boat's) current position data using position data received from three nearby boats, namely, boat 1A, boat 1B and boat 1C.

Say, for example, that at a certain point in time, the boat 1A receives GPS signals from the GPS satellite, learns its current position to be 11° 11' 11.111" N and 111° 11' 11.111" E, and transmits these position data toward the boat 1D, that at the same point in time, the boat 1B receives GPS signals from the GPS satellite, learns its current position to be 9° 9' 09.000" N and 122° 22' 22.222" E, and transmits these position data toward the boat 1D, and that at the same point in time, the boat 1C receives GPS signals from the GPS satellite, learns its current position to be 10° 10' 10.100" N and 144° 14' 44.444" E, and transmits these position data toward the boat 1D

The boat 1D receives these position data with the telecommunications terminal 120a, and by using these sets of position data and angle differences a and 13 between the reception directions (known from rotation angle differences of the directional antenna) can infer its own current position data to be, for example, 12° 12' 12.120" N and 133° 13' 33.333" E.

The telecommunications terminals 120a mounted on the boat 1C in FIG. 8 and on the boat 1D in FIG. 9 both use their directional antennas to receive sets of position data of boats transmitted by the telecommunications terminals 120 of a number of boats 1 among the other boats, and comprise position data receive units 142a for acquiring the sets of position data and detecting reception angle difference(s) between the sets of position data and position data infer units 142b for inferring their own boats' position data from the sets of position data acquired by the position data receive units and the detected reception angle difference(s).

As stated above, the embodiments are configured to have a system for building marine telecommunications network to communicate from one of boats (1, e.g., 1A-1G) navigating on sea (2) to a base station (200) on land (4) with a telecommunications terminal (120) mounted on each of the boats; wherein the telecommunications terminal (120) is configured to build the telecommunication network to establish a communication paths enabling mutual communication between one (e.g., 1A) of the boats that exists out of communication range (200a) with the base station (200) and other (e.g., any of 1A to 1G) of the boats that exists within the communication range such that the one of the boats communicates with the base station (200).

With this, a high-power wireless terminal is no longer unnecessary and real-time data exchange with the base station 200 is possible even far from land. Moreover, since multiple access routes are formed from the subject boat to a boat within range, data transmission speed can be increased and communication redundancy and stability can be enhanced.

Moreover, areas in which a simulated in-range region can be formed can be estimated from the running directions and speeds of surrounding boats 1, and a warning can therefore be issued when departure from the fleet network is likely. Alternatively, running speed and direction of the boat 1 can be controlled to prevent departure from the fleet network. It is also possible to implement auto-navigation of the boat 1 utilizing big data contained in the server 310 with which the base station 200 communicates.

Moreover, when fail safe (F/S) activates in one of the boats 1, a nearby boat can quickly come to its assistance. When a rescue boat is dispatched, it can complete its mission solely inside the fleet network. Boats 1 can exchange data regarding throttle opening, engine speed, steering angle, sea current direction, and the like. As a result, when, for example, the TA sensor (intake air temperature sensor) or other input device of a boat fails, the boat can improve precision of an alternative value adopted by using the input value of the nearest other boat.

Moreover, boats 1 traversing the same route can optimize their route by the lead boat supplying them with data regarding sea currents and other factors affecting navigation. Data transfer can be divided into send/receive by data group, time group, boat group and so on.

In the system, the telecommunications terminal (120) mounted on the one of the boats is configured to build the telecommunication network with the telecommunications terminal (120) mounted on the other of the boats by transmitting a connect-request command from the telecommunications terminal mounted on the one of the boats, by receiving a connect-request OK response from the telecommunications terminal mounted on the other of the boats, and by establishing the communication path with the telecommunication terminal mounted on the one and the other of the boats.

With this, in addition to the advantages and effects mentioned above, it becomes possible to build the communication network speedily and steadily.

In the system, the telecommunications terminal (120) mounted on the one of the boats is configured to build the telecommunication network with the telecommunications terminal (120) mounted on the other of the boats through the telecommunications terminal (120) mounted on a third one (e.g., 1G) of the boats that exists within the communication range with the base station (200).

With this, in addition to the advantages and effects mentioned above, it becomes possible to build the communication network more speedily and more steadily.

In the system, the telecommunications terminal (120) mounted on each of the boats (e.g., 1A-1G) comprises: a command transmit unit (136) configured to transmit a connect-request command requesting connection to the base station (200); a response receive unit (138) configured to receive a connect-request OK response in reply to the connect-request command transmitted from the telecommunications terminal (120) of a transmit source; a communication path establish unit (140) configured to establish the communication path with the telecommunications terminal (120) of the transmit source; and a data transmit/receive unit (142) configured to transmit data between the base station (200) through the communication path established by the communication establishing unit (140).

With this, in addition to the effects and advantages mentioned above, it becomes possible to build the communication network more speedily and more steadily.

In the system, the data transmit/receive unit (142) of the telecommunications terminal (120a) mounted one (e.g., 1C or 1D) of the boats includes: a position data receive unit (142a) configured to receive position data from at least two (e.g., 1A, 1B or 1A-1C) of the boats with a directional antenna and to determine angle difference of the at least two boats; and a position inference unit (142b) configured to infer a position of the one of the boat based on the position data from the at least two boats and the determined angle difference of the at least two boats.

With this, in addition to the effects and advantages mentioned above, if some boats are not equipped with GPS receivers, or have malfunctioning GPS receivers 80, the boat 1 can nevertheless infer its current position.

In the system the communications terminal (120) mounted on each of the boats is for wireless data telecommunication over relatively short distance.

In the system, the communications terminal (120) mounted on each of the boats has a maximum range of 3 km.

It should be noted in the above that various kinds of digital communication terminals with display including portable phones, tablet terminals, smartphones, PDAs and portable personal computer can be used as hardware like the ECU 210, wireless telecommunication module 212 and display 106 constituting the navigation assist apparatus 200.

While the present invention has been described with reference to the preferred embodiments thereof, it will be understood, by those skilled in the art, that various changes and modifications may be made thereto without departing from the scope of the appended claims.

What is claimed is:

1. A system for building a marine telecommunications network to communicate from boats navigating on sea to a base station on land with a telecommunications terminal mounted on each of the boats;
   wherein the telecommunications terminal is configured to build the telecommunication network to establish communication paths enabling mutual communication between one of the boats that exists out of communication range with the base station and other of the boats that exists within the communication range such that the one of the boats communicates with the base station;
   wherein the telecommunications terminal mounted on each of the boats comprises:
      a command transmit unit configured to transmit a connect-request command requesting connection to the base station;
      a response receive unit configured to receive a connect-request OK response in reply to the connect-request command transmitted from the telecommunications terminal of a transmit source;
      a communication path establishing unit configured to establish the communication path with the telecommunications terminal of the transmit source; and
      a data transmit/receive unit configured to transmit data between the base station through the communication path established by the communication path establishing unit;
   wherein the data transmit/receive unit of the telecommunications terminal mounted on the one of the boats includes:
      a position data receive unit configured to receive position data from at least two of the boats with a directional antenna and to determine angle difference of the at least two boats; and
      a position inference unit configured to infer a position of the one of the boats based on the position data from the at least two boats and the determined angle difference of the at least two boats.

* * * * *